US007903930B2

(12) United States Patent
Fujita et al.

(10) Patent No.: US 7,903,930 B2
(45) Date of Patent: *Mar. 8, 2011

(54) DATA RECORDING APPARATUS AND SYSTEM HAVING SUSTAINED HIGH TRANSFER RATES

(75) Inventors: Kouji Fujita, Yokohama (JP); Hideo Nishijima, Hitachinaka (JP); Kazuya Yamashita, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1373 days.

This patent is subject to a terminal disclaimer.

(21) Appl. No.: 10/939,209

(22) Filed: Sep. 9, 2004

(65) Prior Publication Data

US 2005/0031319 A1 Feb. 10, 2005

Related U.S. Application Data

(63) Continuation of application No. 09/528,491, filed on Mar. 17, 2000, now Pat. No. 7,349,623.

(30) Foreign Application Priority Data

Mar. 19, 1999 (JP) .................................... 11-074997

(51) Int. Cl.
*H04N 9/80* (2006.01)
(52) U.S. Cl. ........................................ 386/240; 386/344
(58) Field of Classification Search .................... 386/46, 386/95, 98, 112, 125, 126
See application file for complete search history.

(56) References Cited

U.S. PATENT DOCUMENTS

| 4,611,314 | A | 9/1986 | Ogata et al. |
| 5,432,769 | A | 7/1995 | Honjo |
| 5,438,423 | A | 8/1995 | Lynch et al. |
| 5,479,303 | A | 12/1995 | Suzuki et al. |
| 5,493,548 | A | 2/1996 | Kamioka |
| 5,546,191 | A * | 8/1996 | Hibi et al. ....................... 386/83 |

(Continued)

FOREIGN PATENT DOCUMENTS

JP 05-109205 A 4/1993

(Continued)

OTHER PUBLICATIONS

Japan Patent Office (JPO) office action for JPO patent application JP2004-201274 (Feb. 26, 2008).

(Continued)

*Primary Examiner* — Huy T Nguyen
(74) *Attorney, Agent, or Firm* — Kilpatrick Townsend & Stockton LLP

(57) ABSTRACT

According to the invention, techniques for recording data onto recording media at relatively high transfer rates for relatively long periods of time. Embodiments according to the present invention include systems and apparatus capable of an improved sustained rate of data recording onto disk type-recording media, for example. Many embodiments can remove the upper limits of both recording capacity and the number of media that can be used. Select embodiments can be used with different kinds of recording media as well. In a specific embodiment, the area on a hard disk is divided into three areas. A first area can be suitable for sequential recording of continuous data. A second area can be suitable for random recording of discontinuous data. A third area can be used for recording logical sector numbers, coupling logical sector numbers, and file information that are used for marking each of the first and second areas, so that continuous data can be recorded on the hard disk at a high data rate.

10 Claims, 9 Drawing Sheets

U.S. PATENT DOCUMENTS

| | | | |
|---|---|---|---|
| 5,737,481 A * | 4/1998 | Gushima et al. | 386/113 |
| 5,740,435 A | 4/1998 | Yamamoto et al. | |
| 5,761,373 A | 6/1998 | Yamamoto | |
| 6,192,191 B1 | 2/2001 | Suga et al. | |
| 6,278,837 B1 | 8/2001 | Yasukohchi et al. | |
| 6,282,365 B1 * | 8/2001 | Gotoh et al. | 386/95 |
| 6,295,409 B1 | 9/2001 | Ikeda | |
| 6,304,714 B1 | 10/2001 | Krause et al. | |
| 6,408,301 B1 | 6/2002 | Patton et al. | |
| 6,424,385 B1 | 7/2002 | Koyama | |
| 6,442,327 B1 | 8/2002 | Yamada et al. | |
| 6,684,026 B2 | 1/2004 | Kanota et al. | |
| 6,795,640 B1 | 9/2004 | Honda | |
| 2002/0028026 A1 | 3/2002 | Chen | |

FOREIGN PATENT DOCUMENTS

| | | |
|---|---|---|
| JP | 07-45005 A | 2/1995 |
| JP | 08-129856 A | 5/1996 |
| JP | 08-195035 A | 7/1996 |
| JP | 08-212708 A | 8/1996 |
| JP | 08-221303 A | 8/1996 |
| JP | 08-241230 A | 9/1996 |
| JP | 08-242423 A | 9/1996 |
| JP | 09-055835 A | 2/1997 |
| JP | 09-091879 A | 4/1997 |
| JP | 09-120342 A | 5/1997 |
| JP | 09-160813 A | 6/1997 |
| JP | 09-231682 A | 9/1997 |
| JP | 10-063432 A | 3/1998 |
| JP | 10-161816 A | 6/1998 |
| JP | 10-188533 A | 7/1998 |
| JP | 10-234007 A | 9/1998 |
| JP | 10-269699 A | 10/1998 |
| JP | 10-285504 A | 10/1998 |
| JP | 10-285543 A | 10/1998 |
| JP | 10-285544 A | 10/1998 |
| JP | 10-334596 A | 12/1998 |
| JP | 10-340533 A | 12/1998 |
| JP | 11-004410 A | 1/1999 |
| JP | 11-69279 A | 3/1999 |
| WO | WO96/33579 A1 | 10/1996 |

OTHER PUBLICATIONS

Japan Patent Office (JPO) office action for JPO patent application JP2004-201274 (Sep. 10, 2008).

Japan Patent Office (JPO) office action for JPO patent application JP2004-201274 (Dec. 1, 2008).

Japan Patent Office (JPO) office action for JPO patent application JP2003-362751 (Sep. 24, 2008).

Japan Patent Office office action for patent application JP2009-001241 (Oct. 12, 2010).

* cited by examiner

DATA RECORDING APPARATUS AND SYSTEM HAVING SUSTAINED HIGH TRANSFER RATES

CROSS-REFERENCES TO RELATED APPLICATIONS

This application is a Continuation Application of U.S. patent application Ser. No. 09/528,491, filed Mar. 17, 2000 and titled "Data Recording Apparatus and System Having Sustained High Transfer Rates," which claims priority from Japanese Patent Application Reference No. 11-074997, filed Mar. 19, 1999, each of which is incorporated herein by reference for all purposes.

BACKGROUND OF THE INVENTION

The present invention relates generally to disk type data recording, and specifically to systems and apparatus used in reproducing digital media.

In recent years, many consumer-oriented products targeted to meeting a rising consumer demand for recording information have become available on the market. Data recording devices of many types now exist that can record data on various types of media. For example, hard disks can be prepared for use in personal computers ("PCs") and magnetic recording tape can be obtained for digital VTR, and the like. In particular, many types of storage media allow information stored thereon to be accessed at random, that is, the information need not be stored in any particular order on the media. Other types of media are sequential. Sequential media can provide quicker access to information stored thereon, but the information is stored in a sequential order on the medium. Further, digital information such as video and audio signals can be recreated with substantially the same quality as when recorded, even when the recordings are edited and copied repetitively. With such advantages, electronic storage media can provide many benefits to both commercial and business applications.

Applications may seek to store large amounts of information onto various digital media. While advantages to such applications can be readily perceived, further efficiencies can be realized. In particular, the techniques used to store information on various media can be improved to accommodate applications that seek to store and retrieve large amounts of information from the media at suitable data rates.

What is really needed is an apparatus for recording relatively large amounts of data onto disk type recording media.

SUMMARY OF THE INVENTION

According to the invention, techniques for recording data onto recording media at relatively high transfer rates for relatively long periods of time are provided. Embodiments according to the present invention include systems and apparatus capable of an improved sustained rate of data recording onto disk type-recording media, for example. Many embodiments can remove the upper limits of both recording capacity and the number of media that can be used. Select embodiments can be used with different kinds of recording media as well.

In a representative embodiment according to the present invention, a data recording apparatus is provided. The recording apparatus can provide a recording medium having a capacity that is to be divided into at least a first area and a second area. Further, data received from external sources can also be divided so that continuous data is recorded in the first area and discontinuous data is recorded in the second area, for example.

In a specific embodiment, the recording medium can further be provided with a third area used to record management information of the data recorded in the first and second areas. Continuous data can be buffered one or more times before it is recorded in the first area. If the data in the buffer has reached a predetermined capacity, then the continuous data can be copied from the buffer and recorded onto the recording medium. Data on the disk can be recorded into a plurality of recording blocks disposed in tracks formed in a concentric circle pattern on a disk type-recording medium, for example.

In another specific embodiment, the first and second areas of the recording medium can comprise a plurality of recording sectors. Continuous data can be recorded sequentially in the recording sectors disposed in the first area, for example. The recording medium can be a disk type recording medium, or the like, in which case, each of the areas thereon can be divided along the radial direction of the disk. In a particular embodiment, the first area can be disposed at the outermost periphery of the medium. Data recorded in the first area can be copied into the second area, contemporaneously or at a later time. The numbers of the recording sectors in the first area in which the continuous data is recorded can be recorded in the third area, for tracking purposes and the like.

In a further specific embodiment, faulty recording sectors on the recording medium can be detected and the numbers of the fault sectors can be recorded in the third area. If continuous data is to be recorded in the first area, the data may be recorded by skipping such faulty recording sectors. However, in select embodiments, the same data as that in a block just positioned before a fault sector can be recorded in the fault sector so that the recording operation continues without interruption.

In a yet further specific embodiment, cylinders that include one or more fault sectors can be recognized. Thus, a fault sector, or sectors, within a recording cylinder among concentric circle-like cylinders on the disk type-recording medium can be detected and tracked. The number of the recording cylinder containing the fault can be recorded in the third area, for example. Data can be recorded continuously by skipping the recording cylinder(s) having faults, enabling continuous recording of data in the other cylinders.

Numerous benefits are achieved by way of the present invention over conventional techniques. The present invention can provide techniques for recording continuous data at relatively high transfer rates for relatively long time periods onto a recording medium. The recording medium can be a disk-type recording medium, such as a hard disk or the like. In some embodiments, the area on a hard disk can be divided into three areas. The first area can be used for recording continuous data sequentially, the second area for recording discontinuous data at random, and the third area for recording logical numbers used for marking each of the first and second areas, as well as coupling sector numbers and file information. Many such embodiments can record continuous data on a hard disk at a high transfer rate so that the data can be linked to other data managed by PCs and the like.

Some embodiments can be readily expanded. If additional recording media are employed, the first area or the second area can be secured in virtually any size on those additional media. Because neither a file manager program nor an operating system (OS) program controls the first area directly, the number of hard disks that can be added is conceptually without limit. Many embodiments include hard disks that can be suitable for recording video data from monitoring cameras, and the like, for which a long time recording of audio-visual ("AV") data is desirable. Additionally, in some embodiments, data in both of the sequential recording (first) area and the random (second) recording area can be read back at random, making it possible to handle a plurality of data types (continuous and discontinuous) concurrently in one data recording apparatus. For example, it is possible to record data endlessly in the sequential recording area and then copy the data from the endless recording area into another area, either contemporaneously while the recording is being done, or at some time later.

These and other benefits are described throughout the present specification. A further understanding of the nature and advantages of the invention herein may be realized by reference to the remaining portions of the specification and the attached drawings.

DESCRIPTION OF THE SPECIFIC EMBODIMENTS

Figure 1:
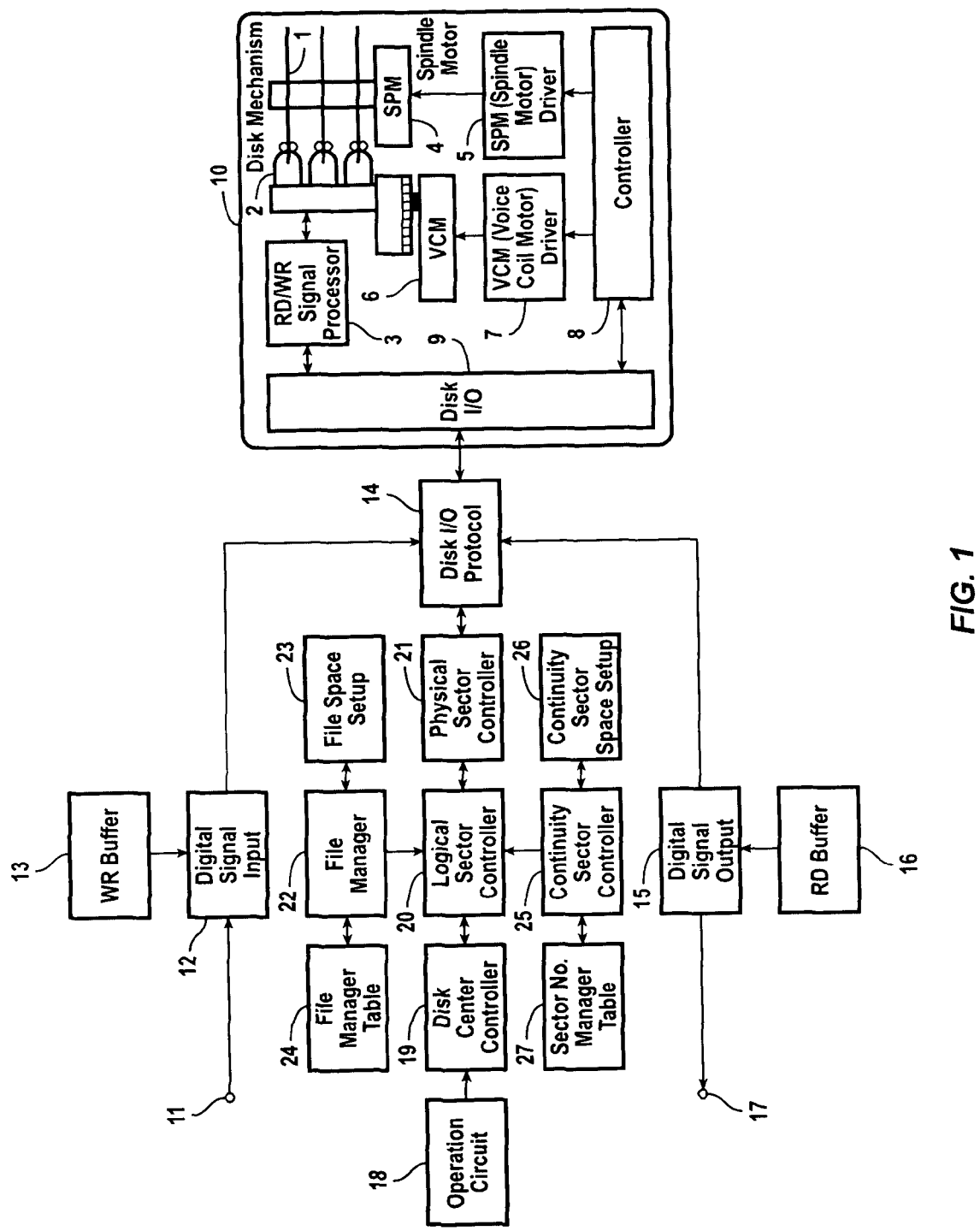
FIG. 1 is a simplified block diagram of a representative example data recording apparatus in a particular embodiment according to the present invention.

The present invention provides techniques for recording data on select recording media. Embodiments can record continuous data at relatively high transfer rates for relatively long periods of time. Select embodiments can record data onto disk type-recording media, and the like. Embodiments according to the present invention include systems and apparatus capable of an improved sustained rate of data recording. Some embodiments can remove the upper limits of recording capacity, number of media used, and kinds of media used.

Increasingly popular digital encoding techniques, such as MPEG2 (Moving Picture Experts Group 2) and MJPEG (Motion Joint Photographic coding Experts Group) have improved the quality of video and audio information available to many applications. Along with the quality improvement of video and audio signals, the amount of data to be handled has also increased, creating strong demand for increased data throughput, i.e., bytes to be transferred per second. In order to meet the demand of such applications, high capacity hard disks have been developed. For example, one commercial unit has a recording capacity of approximately 25 GB and a disk rotation speed of about 10,000 rpm. Such hard disks can also be provided with interfaces capable of transferring data at a rate of approximately 33 MB/s, for example.

Furthermore, if video and audio digital information as described above are to be edited with sufficient quality using MPEG or MJPEG coding techniques, a transfer rate that allows for continued recording or reading back on/from the recording becomes desirable. In other words, the sustained rate that a disk type storage medium can be used in a particular application becomes an important characteristic. The transfer rate typically described in the specifications of hard disks at present is typically a maximum transfer rate between hard disk interface and a PC interface. For example, a particular disk may have a maximum transfer rate of about 33 MB/s. The sustained rate, however, is determined according to the recording density, the disk rotation speed, and the head seek speed of the hard disk. For example, in a low-end hard disk, the actual transfer rate can be about 12 to 17 MB/s, for example. In addition, sometimes files can be managed on a hard disk in recording blocks ("sectors"). Sectors can be recorded at random places on a disk by a file manager program installed in the PC, for example. Sometimes, discontinuous empty sectors can become scattered on the disk as a result of repetitive erasure and addition of files. Consequently, if continuous data is to be recorded on a hard disk, the head of the hard disk seeks the scattered empty sectors sequentially during the data recording, which can lead to lower sustained data rates, thereby disabling high rate recording of continuous data.

A PC can manage data files on a hard disk using a file manager program or an operating system program ("OS"), for example. The hard disk capacity that can be handled in the PC and the number of hard disks that can be used with the program can be limited by the specifications of the file manager program or the OS. For example, if a file manager program conforms to FAT16, the capacity per partition can be limited to approximately 2 GB and the number of additional hard disks may be limited to approximately 26, in a representative embodiment. The maximum recording capacity of the hard disk unit will thus be approximately 52 GB in this representative example. Consequently, such a particular file manager program would not be used to record data on a 100 GB hard disk unit, for example.

Disk type recording media can provide random access and fast recording/reading back of data, for example. Conventionally, hard disks installed in PCs can be used to write and read data or files respectively and repetitively. Thus, fragmentary problems that arise from such hard disks are not as serious in many conventional embodiments. For example, a fragmentary problem could arise in an example case where approximately 1000 files of approximately 32KB in size are written on a hard disk. Then 300 of the 1000 files (capacity: 9600 KB) are erased at random after the writing. The hard disk in this state will have scattered discontinuous empty areas thereon. If a file of approximately 9600 KB in size is recorded on the hard disk just after the erasing, the file manager program can then record the 9600 KB file within the scattered empty areas. Consequently, searching, recording, and verifying operations are repeated for those scattered empty areas as needed on the hard disk. Such operations can lower the throughput of the hard disk.

If data to be recorded/read back on/from a hard disk is a single short file, data, or an application program to be handled within a PC, for example, such a fragmentary problem will not become serious. However, applications in which video or audio signals ("AV signals") are converted to continuous digital data that is recorded/read back on/from a hard disk, conventional file management techniques typically do not provide data throughput because the overhead becomes too large. AV signal data, such as an MPEG stream, for example, requires a sustained rate of about 10 Mbps. In addition, if a plurality of data types (continuous and discontinuous) is to be handled thereafter, the sustained rate can be increased.

One technique for reading/writing comparatively large files from/on hard disks can read data in ascending or descending order of access sector numbers from those hard disks provided with memory, respectively. This technique is intended to minimize the number of seek operations for reading a data file. Further details regarding operation of hard disk drive units employing such techniques can be had by reference to a Japanese Patent Application No. 10-63432, the entire contents of which are incorporated herein by reference for all purposes.

FIG. 1 is a simplified block diagram of a representative example data recording apparatus in a particular embodiment according to the present invention. This diagram is merely an illustration and should not limit the scope of the claims herein. One of ordinary skill in the art would recognize other variations, modifications, and alternatives. FIG. 1 illustrates a block diagram of a disk type recording/reading apparatus in a representative embodiment according to the present invention. Data entered from digital stream input terminal 11 is transferred to a digital signal input circuit 12. The data to be processed in this embodiment comprises digital data, which can be a result of compressing AV signals using MJPEG coding, and the like. In some embodiments, the data can be continuous data transferred at a high rate. In some embodiments, the MJPEG coding may be replaced with other image compression coding.

The digital input processor 12 adds delimiter information to each frame of input video data so as to divide the data into data blocks of a predetermined size. The divided data can be stored in a WR buffer 13, for example. The WR buffer 13 comprises, for example, a semiconductor memory and can be used to store data entered from the digital signal input circuit 12. The data can be stored sequentially in an example embodiment. When a predetermined capacity for WR buffer 13 is reached, the data stored in the WR buffer 13, can be entered sequentially to a disk I/O protocol circuit 14 via the digital signal input circuit 12, for example.

In a representative embodiment according to the present invention, the disk I/O protocol circuit 14 operates according to a data protocol conforming to the IDE interface used generally for disk-type storage. However, in other embodiments, the disk I/O protocol circuit 14 may use other protocols, such as for example, SCSI, USB, IEEE1394 standards, and the like. The disk I/O protocol circuit 14 handshakes with the object hard disk 1 to transfer data to the disk interface 9 in units of 512 bytes, which is the minimum recording block ("sector") of the hard disk 1, in this embodiment.

FIG. 1 further illustrates a mechanism 10 of hard disk 1 in a specific embodiment. Hard disk mechanism 10 comprises a plurality of disks 1 rotated by a spindle motor 4 ("SPM"). In a representative embodiment, each of the disks is attached to the shaft of SPM 4. Each of the disks 1 can comprise a glass disc formed by magnetic evaporation, for example. A head 2 is mounted for each side of each of the disks 1. The head 2 is driven in the radial direction of the disk 1 by a voice coil motor 6 ("VCM") so as to record/read back data on/from sectors that can be disposed on the disk in a concentric circle pattern, for example.

The SPM driver 5 controls the rotation speed of the SPM 4. The VCM driver 7 drives the VCM 6 so as to control the position of the head 2 in the radial direction of the disk 1 so as to move the head 2 to the position of a particular sector. The controller 8 controls the driving of both VCM driver 7 and SPM driver 5 according to the recording position information from the disk interface 9, for example. The RD/WR signal processor 3 can modulate/demodulate signals to record/read back data on/from the disk 1 via the head 2, as well as correct data errors.

In a representative embodiment according to the present invention, sectors are disposed in a concentric circle pattern on each of a plurality of disks 1. In a representative embodiment according to the present invention, hard disks can have a storage capacity of approximately 6.4 GB, for example. In a specific embodiment, a hard disk unit can have on the order of eight logical disks 1 (one of the eight disks allows data to be recorded/read on/from only one side, in this embodiment, however). A logical recording/reading head 2 is provided to each side of each disk 1, so a total of 15 heads 2 is provided in a specific embodiment. Approximately 13320 logical sectors (to be referred to as logical cylinders hereafter) can be formed in a concentric circle pattern on each side of each disk. Some 63 logical sectors can be formed in a cylinder. In a specific embodiment, the recording capacity per sector can be approximately 512 bytes. The recording capacity of a representative hard disk unit in a particular embodiment can be calculated as follows:

$$512(\text{bytes}) \times 63(\text{sectors}) \times 13320(\text{cylinders}) \times 15(\text{heads}) = 6444748800 \text{ bytes} \quad (1)$$

The number of sectors of the whole hard disk unit is calculated as follows:

$$63(\text{sectors}) \times 13320(\text{cylinders}) \times 15(\text{heads}) = 12587400 \text{ (sectors)} \quad (2)$$

In a representative embodiment according to the present invention, logical sectors can be specified uniquely by three items: a head number, such as, for example 1 to 15, a cylinder number 0 to 13319, for example, and a sector number, such as, for example 1 to 63. A target sector accessed according to the specification of the head number, the cylinder number, and the sector number as described above is referred to as a physical sector. A serial number is given to each of the sectors found in the above expression 2, so that those sectors are handled as continuity sectors. Such sectors are referred to as logical sectors. Those logical sectors can also be numbered freely on each disk. For example, the fifteen sides of the disks 1 are numbered so as to be used in parallel starting at the outermost periphery, thereby the moving distance of the head 2 can be minimized. As a result, each disk can be switched to another for accessing. In such embodiments, a logical sector number is calculated according to the following relation:

$$\text{LSN} = \text{SPT} \times (\text{HEN} + \text{NOS} \times \text{CYN}) + \text{SEN} - 1 \quad (3)$$

where LSN is a logical sector number, SEN is a sector number, CYN is a cylinder number, HEN is a head number, the number of sectors in a cylinder is SPT, and the total number of heads is NOS.

The numbering of logical sectors in the embodiments described above can be well suited for recording/reading back continuous data, for example. Although the (expression 3) is used for numbering the logical sectors on the disks in a hard disk unit, such numbering may also be made for logical sectors on a specified disk. Alternatively, a plurality of numbering systems may be prepared for logical sectors, in various embodiments according to the present invention.

Data read from a hard disk can be entered to the disk I/O protocol circuit 14 via the disk interface 9 according to the disk's I/O protocol. Continuous data read from the disk I/O protocol circuit 14 can be divided into data blocks having a predetermined length according to a delimiter information, then stored in an RD buffer 16 temporarily. The RD buffer 16 can comprise, for example, a semiconductor memory and can store sequential data, and the like. The data stored in the RD buffer 16 can be output from a digital output terminal 17 when the data reaches a predetermined amount, for example.

In a representative embodiment according to the present invention, data can be recorded and read back in/from hard disks in units of sectors (512 bytes, for example) as described above. However, when continuous data is stored in a WR buffer using units of sectors, or the data is recorded in the disk I/O protocol circuit 14 using units of sectors, the overhead can become large. Overhead can arise due to the specification of the head number, the cylinder number, and the sector number for each of the sectors, as well as the head seek operation of the disk mechanism 10. Thus, such schema can become inconvenient for accessing continuous data. Therefore, in a representative embodiment according to the present invention, data can be recorded/read back on/from a hard disk in portions appropriate to continuous data. Such embodiments can maintain a maximum sustained rate of data access to a hard disk, for example.

In a representative embodiment according to the present invention, therefore, continuous data can be recorded/read back on/from a hard disk in units of cylinders. Accessing a hard disk in cylinders, the overhead due to rotational delay of the disk when accessing a single sector can be avoided, thereby reducing the overhead of the disk access to the delay due to a moving distance of the head in the radial direction of the disk. Higher data transfer rates, such as for example 10 Mbps or more, can be achieved by controlling the record/read back of data using a plurality of cylinders collectively. Accordingly, throughput of the hard disk can be maximized in representative embodiments.

In specific embodiments, minimum capacities of RD buffer 16 and WR buffer 13 can be determined in order to enable accessing the hard disk in units of cylinders. For example, a 6.4 GB hard disk having 63 sectors per cylinder that is to be accessed in units of 30 cylinders, would require at least a 967680-byte RD buffer 16 and a 967680-byte WR buffer 13. Since memory is typically unavailable in fractional capacities, so each buffer can be realized using a 1 MB memory, for example.

In a representative embodiment according to the present invention, disk area can be divided to accommodate access in units of cylinders. Data can be written/read back on/from a hard disk intermittently and repetitively in each cluster of the disk. Clusters can comprise of a plurality of logical sectors, such as for example, 4 sectors/cluster in a PC based file manager program. Thus, the rate that clusters are fragmented can be increased when the disk is accessed in units of cylinders, causing the sustained data access rate of the hard disk to be reduced. In a representative embodiment according to the present invention, data can be recorded on a hard disk continuously at its maximum sustained rate, by recording the consecutive logical sector numbers described above sequentially. In addition, the head moving distance for disk access can be managed to approximately one-cylinder distance, which is the minimum limit in the magnetic disk radial direction.

In a representative embodiment according to the present invention, the recording area of one or more hard disks can be divided into a plurality of areas. For example, in a specific embodiment three areas can be provided for record/read back of continuous data. In a specific embodiment, a first area for recording/reading back continuous data is provided. Further, a second area for recording/reading back single (discontinuous) data according to the file management methods employed in conventional PCs, can also be included. Yet further, a third area for recording management information of both continuous data and single (discontinuous) data can be provided.

Figure 2:
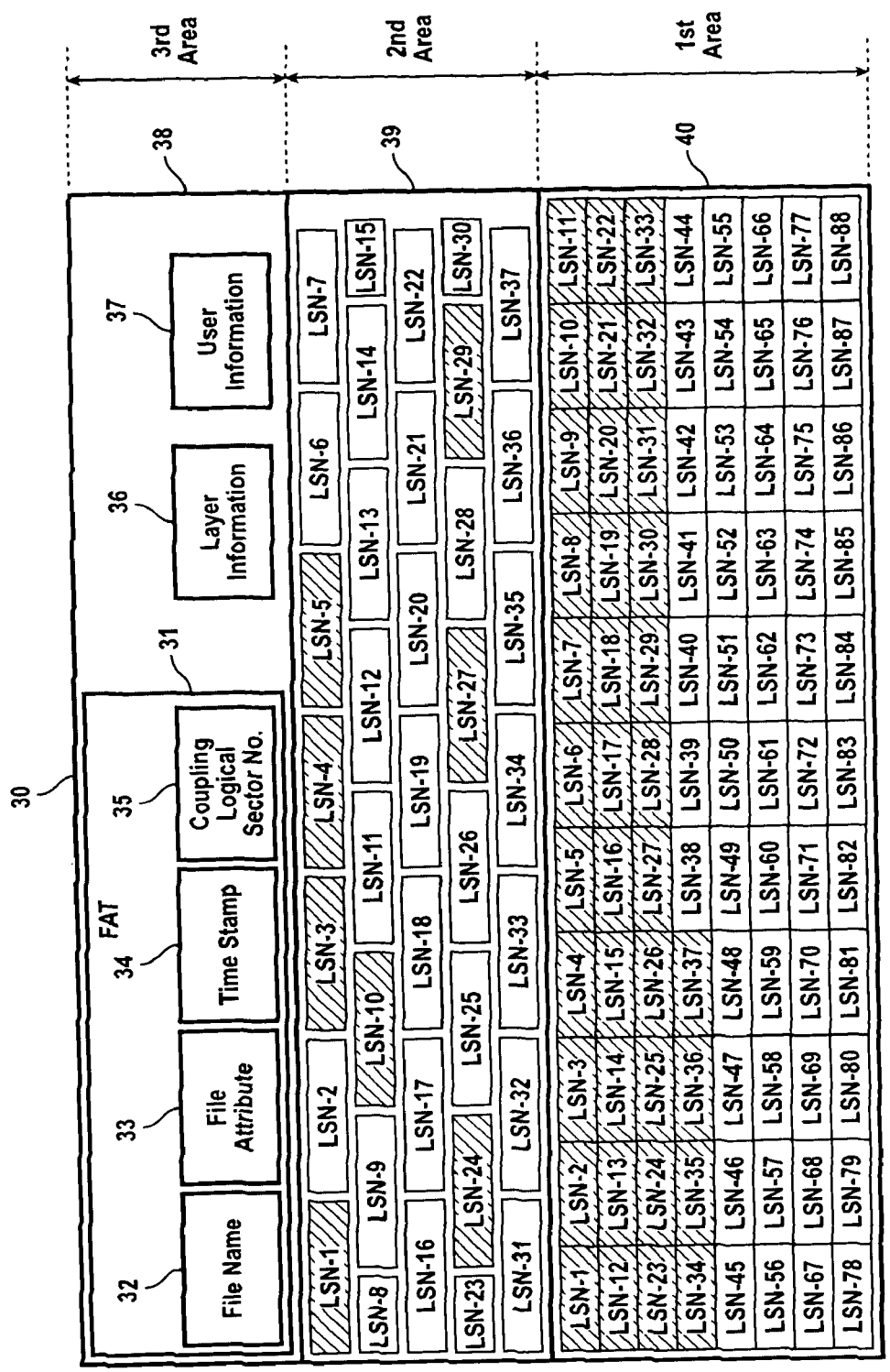
FIG. 2 is a simplified diagram showing an example arrangement of data recorded on a hard disk in a particular embodiment according to the present invention.

FIG. 2 is a simplified diagram showing an example arrangement of data recorded on a hard disk in a particular embodiment according to the present invention. This diagram is merely an illustration and should not limit the scope of the claims herein. One of ordinary skill in the art would recognize other variations, modifications, and alternatives. FIG. 2 illustrates a representative internal structure of a hard disk, which is divided into three areas; a first area, a second area, and a third area. As shown in FIG. 2, the area 30 in the hard disk comprises of the third area 38, the second area 39, and the first area 40. In the third area 38, a FAT 31 is provided. However, it is noteworthy that specific embodiments according to the present invention can be realized using other types of file management programs. FAT 31 is a table area for managing files on the hard disk 30. The FAT 31 comprises an area 32 for recording a file name group of continuous data or single (discontinuous) file data recorded on the hard disk. Further, FAT 31 comprises an area 33 for recording file attributes, an area 34 for recording a time stamp for each file, and an area 35 for recording logical sector numbers analogous to indexes of continuous logical sectors. Data is recorded in the first area 40 and the second area 39. The data recorded in areas 40 and 39 can have its own characteristics respectively.

In first area 40, continuous data can be recorded sequentially in the sectors. Partial sector writing and erasures are not permitted to the logical sectors of first area 40 in a representative embodiment according to the present invention. In FIG. 2, the dark portions in the first area 40 represent portions having data recorded thereon. The first area 40 can be dedicated to recording of continuous data. Such continuous data can comprise such digital data as AV, and the like. Logical sector numbers for starting points, ending points, or index points of data recorded in area 40 can be stored in logical sector number manager table 27 in FIG. 1, for example.

If a signal for selecting read-back of specified data is entered from an operation circuit 18 in FIG. 1, a disk center controller 19 can read the logical sector of the selected data from the logical sector number manager table 27. Then, continuity sector controller 25 can specify a logical sector in the first area 40 of the hard disk 30 at random, so that the data is read back from the sector. If the logical sector controller 20 accesses logical sectors sequentially while recording, then a physical sector controller 21 can specify each logical sector and can determine the head number, the cylinder number, and the sector number, for example, for the target physical sector. Then those items can be entered into the disk I/O protocol circuit 14. The head 2 of the disk mechanism 10 can then be positioned at the target sector so that data can be written or read back in/from the sector.

In a representative embodiment according to the present invention, first area 40 in the hard disk can be used for recording continuous AV data in monitoring applications, for example. For embodiments employed in monitoring system applications, it can be desirable to record both video and audio data for relatively lengthy periods of time. In such embodiments, upon occurrence of an event of interest, such as, for example, when an alarm is issued, it becomes desirable to record both video and audio data continuously at that time. Continuous AV data from a monitoring camera, for example, can be recorded in the first area 40 of the hard disk. In a specific embodiment, when an alarm is issued, each logical sector number can be stored in sector number manager table 27. The disk center controller 19 can perform an alarm search or a priority search by alarm level. At a later time, the searched alarm point can be specified, thereby specifying the logical sectors in the first area 40 from which data can be read back from at random. If logical sectors in a hard disk (in the first area 40) with a limited capacity are specified endlessly, an endless recording can be made. In this embodiment, data recorded in logical sectors in the first area 40 in a predetermined section after an alarm is issued can be read back from the logical sectors in the first area 40 and then can be copied into the second area 39 of the hard disk 2. As a result, the AV data corresponding to the issued alarm in the first area can be saved.

Figure 5:
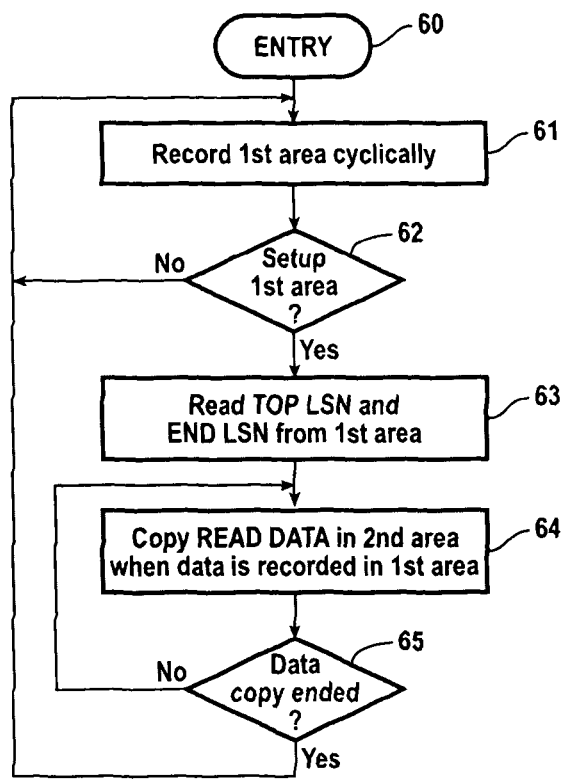
FIG. 5 is a simplified flowchart of a representative data copy operation from a first area into a second area in a particular embodiment according to the present invention.

FIG. 5 is a simplified flowchart of a representative data copy operation from a first area into a second area in a particular embodiment according to the present invention. This diagram is merely an illustration and should not limit the scope of the claims herein. One of ordinary skill in the art would recognize other variations, modifications, and alternatives. FIG. 5 illustrates processing for a representative embodiment in a monitoring application, such as the one described above. In FIG. 5, processing begins with an ENTRY step 60. In a step 61, continuous data can be recorded endlessly in the first area 40 of the hard disk 1. In a step 62, based upon an entered command, it can be determined whether to hold the data in a predetermined range in the first area 40. If no partial data is to be held in step 62, control returns to step 61. If partial data is to be held in step 62, control continues with a step 63. In step 63, both start and end logical sector numbers of the first area 40 can be read back. The start and end logical numbers indicate the range of the data held in step 62. Then, in a step 64, data is read back from both start and end logical sectors in the first area 40 in parallel to the endless recording in the first area 40. The read data can be recorded in the second area 39, for example. The copy operation from the first area 40 to the second area 39 can be continued up to the end sector number. In addition, the endless recording in the first area 40 need not be stopped by the copy operation. Rather, the recording can be continued according to the priority given to the operation over the copy operation. The hard disk that can handle a plurality of data types (continuous and discontinuous) in different operations at the same time as described above is especially suitable for such monitoring embodiments that continue recording nonstop.

In a representative embodiment according to the present invention, a hard disk can include a first area, in which a plurality of data types (continuous and discontinuous) can be stored and read back. Referring again to FIG. 1, WR buffer 13 and the RD buffer 16 can be configured to meet such requirements. While data is recorded on the hard disk, the read-back data stored in the RD buffer is output. While data is read back from the hard disk, data is stored in the WR buffer 13. For example, in a specific embodiment, data can be recorded in the first area in the hard disk at a data rate of, for example, approximately 6 Mbps. Approximately contemporaneously, data can be read back from the first area at a data rate of, for example, approximately 6 Mbps. An alarm sector number can be recorded in a specified sector in the first area at a data rate of, for example, approximately 6 Mbps, and the sustained data rate of the hard disk can be for example, approximately 40 Mbps. In this specific embodiment, data can be written/read back on/from the hard disk at a rate higher than the total of the multiple data rates at the same time. A particular embodiment can carry out both recording and reading back operations under such conditions even when an overhead that includes both head seek time and timing delay time exists.

Figure 6:
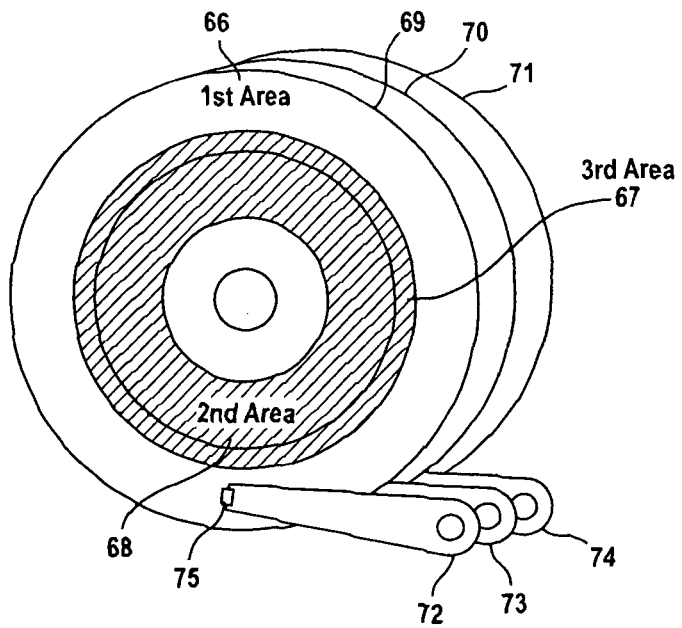
FIG. 6 is a simplified diagram showing a representative arrangement for areas on a hard disk in a particular embodiment according to the present invention.

FIG. 2 illustrates second area 39 of a hard disk. In second area 39, files can be managed according to random access techniques, such as those employed in Personal Computer file systems. In this second area, data can be recorded and erased at random, for example. FIG. 2 illustrates a dark portion within the second area 39, representing portions of second area 39 having data recorded therein. In this second area 39, single (discontinuous) data can be recorded in a random or "scattered" manner. In this area, fragments can be generated. Data to be recorded in this second area can be recorded in a scattered and/or divided arrangement within the second area. Consequently, both sector coupling state and directory hierarchical structure information can be managed by a file manager 22 illustrated in FIG. 1 and stored in the file manager table 24. In a representative embodiment according to the present invention, the area on a magnetic recording disk can be divided into the first to third areas in the radial direction. In particular, the first area that provides a sustained data rate can be disposed at the outer portion of the disk. FIG. 6 shows an image of the disk area divided as described above.

FIG. 6 is a simplified diagram showing a representative arrangement for areas on a hard disk in a particular embodiment according to the present invention. This diagram is merely an illustration and should not limit the scope of the claims herein. One of ordinary skill in the art would recognize other variations, modifications, and alternatives. In FIG. 6, the area on each of disks 69 to 71 can be divided into a first area 66, a third area 67, and a second area 68, for example. Data in these areas can be read back by a head 75 moved by the corresponding one of the head seek arms 72 to 74, for example. In a specific embodiment, a 3.5-inch hard disk can have a radius of a recording side of the magnetic recording disk of about 4.5 cm maximum and about 2.0 cm minimum, for example. The number of sectors per cylinder can be approximately proportionate to the radius of the disk. Consequently, the sustained rate can increase as the outer part of the cylinder is approached. For example, in a representative embodiment, for a 3.5-inch hard disk that rotates at approximately 5400 rpm, the sustained rate is approximately 3 MB/s at the outermost portion and approximately 1.5 MB/s at the innermost portion. If the first area for recording continuous data can be disposed near to an area where a maximum sustained rate can be provided; the throughput of data can be increased.

In a representative embodiment according to the present invention, the first and second areas can be configured by entering operation commands for the hard disk that is in the initial status (no-recorded status) from the operation circuit 18. The operation commands can specify the capacities of the first and second areas, and the like. The disk center controller 19 recognizes the operation commands and a file space setup circuit 23 and a continuity sector space setup circuit 26 can obtain the logical sector numbers of the hard disk for each of the areas. This process to divide the hard disk area can occur under the control of the disk center controller 19.

The data from the file manager table 24 and the continuous logical sector number manager table 27 can be recorded in the third area 38 of the hard disk, for example. In a particular embodiment, the management information, when read from the hard disk, can be stored in the file manager table 24 and the continuous logical sector number manager table 27 temporarily, so that the management information in the third area 38 can be updated at predetermined intervals. The third area 38 stores, for example, each file name 32, the file attribute 33, a time stamp 34, a continuous logical sector number 35, directory hierarchical structure information 36, user information 37, and the like. In addition, any of the first, second, and third areas on the hard disk for recording data can be specified from the operation circuit 18. For example, it can be specified so that continuous AV data, having a data rate of approximately 30 frames/sec, for example, can be recorded in the first area and still picture data can be recorded in the second area. Both AV and still picture data can also be recorded in any same area. However, because the data recorded in the first area is sequential data, this data can be read back and recovered easily when, for example, the third area is damaged due to a hard disk failure or a partial damage occurs in the FAT information.

Specific embodiments according to the present invention provide for dividing an area of a hard disk into a sequential recording area, a random recording area, and another area for recording logical sector numbers. The sequential recording area is suitable for recording continuous data, for example. The random recording area is suited to recording discontinuous data, and the like. The third area can be useful for recording logical sector numbers, coupling logical sector numbers, file information, and the like, that can be used for marking each of the sequential and random recording areas. Continuous data can be recorded at a high rate in specific embodiments so as to be linked with the data managed by conventional PCs. In a specific embodiment, a data recording apparatus suitable for recording data, such as video or audio data from monitoring cameras, is provided. Such embodiments can record such data sequentially in logical sectors endlessly, for example. Further, many embodiments can copy the data from the endless recording area into other areas on the hard disk during the recording, thereby managing recording of a plurality of heterogeneous data types (continuous and discontinuous) at the same time in a single apparatus.

Figure 3:
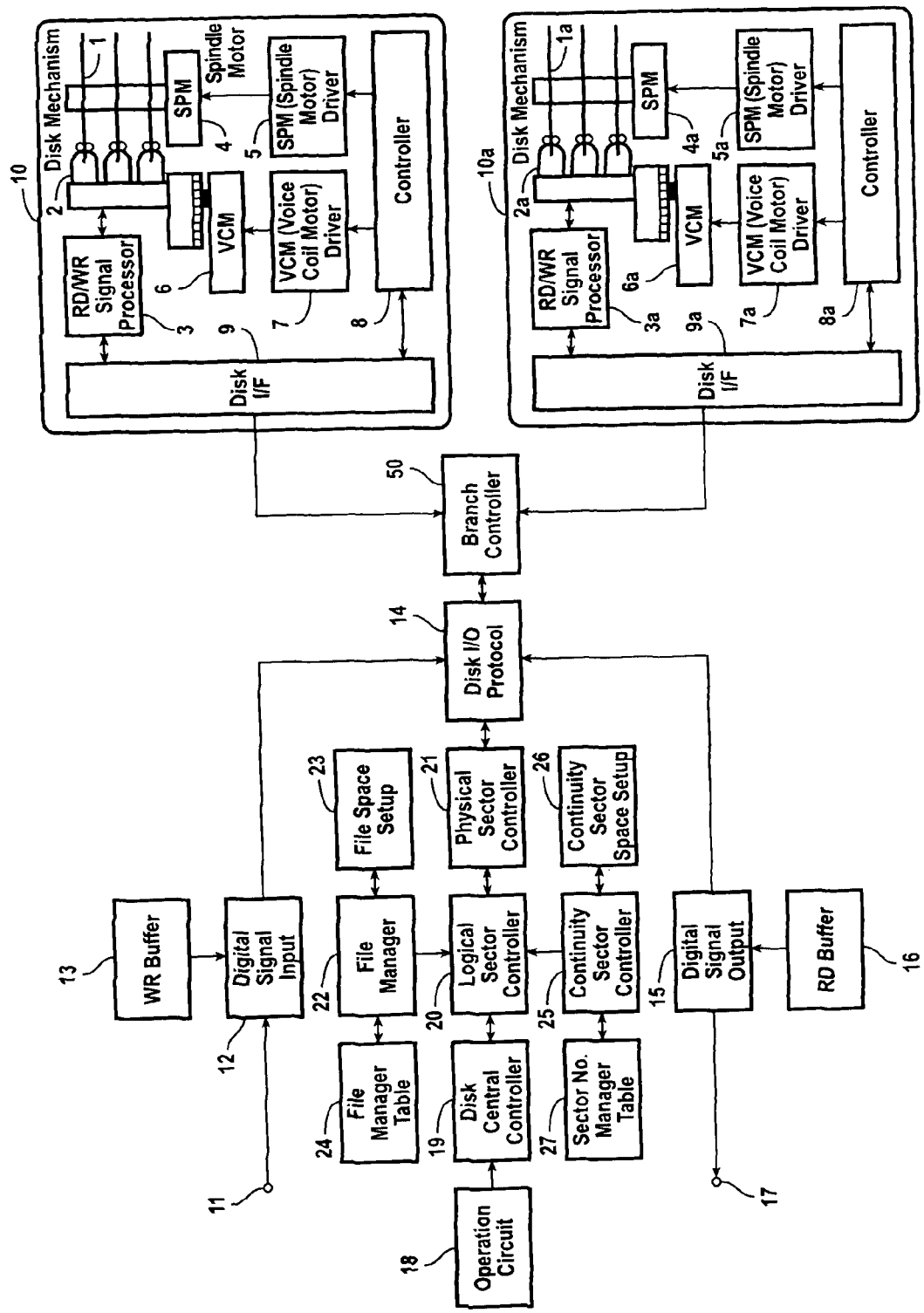
FIG. 3 is a simplified block diagram of a representative example data recording apparatus in another particular embodiment according to the present invention.

Next, another embodiment according to the present invention will be described with reference to FIG. 3. FIG. 3 illustrates a simplified block diagram of a representative embodiment of a data recording having one or more additional hard disks. While operation of the embodiments illustrated by FIG. 3 is described generally using an example having an IDE interface, the interface may be another type. For example, embodiments employing any of a SCSI interface, a USB interface, an IEEE1394 interface, and the like can be readily realized by those of ordinary skill in the art.

FIG. 3 is a simplified block diagram of a representative example data recording apparatus in another particular embodiment according to the present invention. This diagram is merely an illustration and should not limit the scope of the claims herein. One of ordinary skill in the art would recognize other variations, modifications, and alternatives. The embodiment illustrated in FIG. 3 comprises a hard disk mechanism 10a and a hard disk controller 50, which controls mechanism 10a, as well as many functional blocks discussed previously with reference to FIG. 1.

Embodiments comprising hard disks having relatively larger capacities can record such digital data as audiovisual data, and the like are readily achievable by those of ordinary skill in the art. For example, in one representative embodiment, approximately 10M bps of MJPEG format data can be recorded in a hard disk having a capacity of approximately 6.4 GB in about 85 minutes. Embodiments employing disk division techniques according to the present invention can further shorten the recording time. In a representative embodiment according to the present invention, employing one or more additional hard disks can expand the first area suitable for recording continuous data. Adding hard disks can be performed in a variety of ways to form a variety of specific embodiments. For example, in a PC that employs an IDE format hard disk, the PC can typically be provided with approximately four additional hard disk bays. If the PC is equipped with a SCSI interface, then it can connect up to approximately seven hard disks per each SCSI interface, for example.

It is noteworthy that, in some embodiments according to the present invention, because the first area is not under the direct control of a file manager program and associated OS control programs, there is virtually no limit to the number of additional hard disks and the capacity per hard disk. Thus, embodiments according to the present invention are unlike conventional systems. Systems and methods using the techniques of the present invention do not suffer limitations associated with many conventional recordation techniques.

In a representative embodiment according to the present invention, branch controller 50 in FIG. 3 can be provided with, for example, a plurality of IDE interfaces having different addresses. Thus, the continuity sector space setup circuit 26 can set up the third area in the integrated area of the hard disks in the additional disk mechanism 10a to follow the logical sector numbers corresponding to the first area of the hard disk in the disk mechanism 10. In this way, logical sector numbers can be assigned for controlling. The disk I/O protocol circuit 14 operates the switching between addresses of the IDE interfaces following the logical sector numbers corresponding to the third area.

Figure 4:
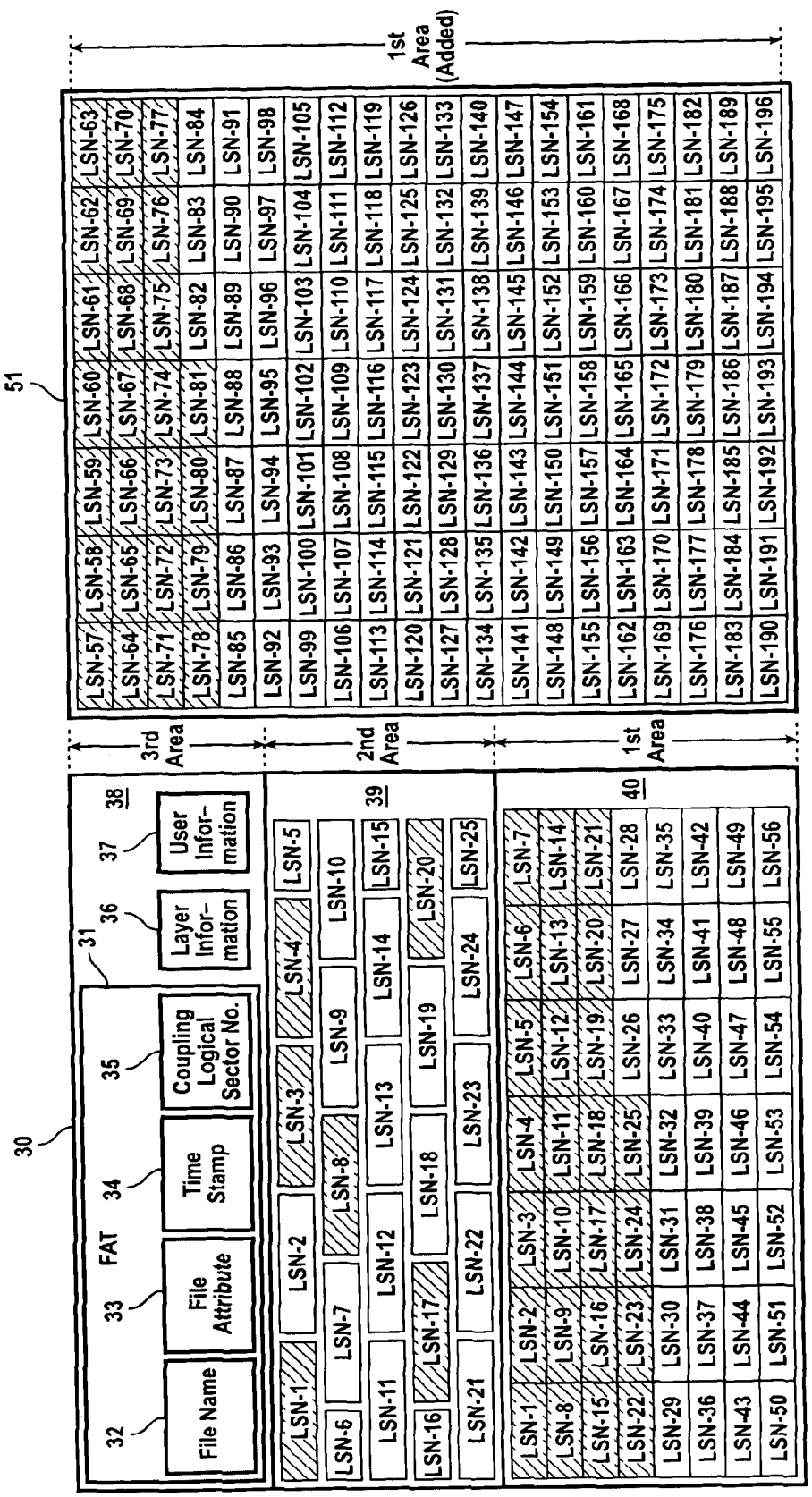
FIG. 4 is a simplified diagram showing an example arrangement of data recorded on a hard disk in a further particular embodiment according to the present invention.

FIG. 4 is a simplified diagram showing an example arrangement of data recorded on a hard disk in a further particular embodiment according to the present invention. This diagram is merely an illustration and should not limit the scope of the claims herein. One of ordinary skill in the art would recognize other variations, modifications, and alternatives. FIG. 4 shows how the areas of the recording media can be divided in the disk mechanisms 10 and 10a of FIG. 3, for example. In FIG. 4, the recording medium 30 comprises a recording area in the disk mechanism 10. The recording medium 51 comprises a recording area in the disk mechanism 10a. In a representative embodiment, the area of recording medium 51 can be used as the first area, for example. Internally, the disk of recording medium 51 can comprise continuous logical block numbers that can be accessed so that continuous data can be recorded in the blocks sequentially according to logical sector block numbers, for example.

In a representative embodiment according to the present invention, the first area suitable for recording continuous data can be expanded to additional hard disks, for example. Because the file management program and the OS do not control the first area directly, there is no conceptual limit to the number of additional hard disks or the capacity per hard disk. Many embodiments are suitable for recording data in monitoring cameras, and the like, that record AV data for relatively long periods of time. For example, in one representative embodiment, about four hard disks of approximately 25 GB in capacity can be connected to receive video data at a rate of about 2 frames/sec for up to one month or more.

Next, still further embodiments according to the present invention will be described with reference to FIG. 7.

Figure 7:
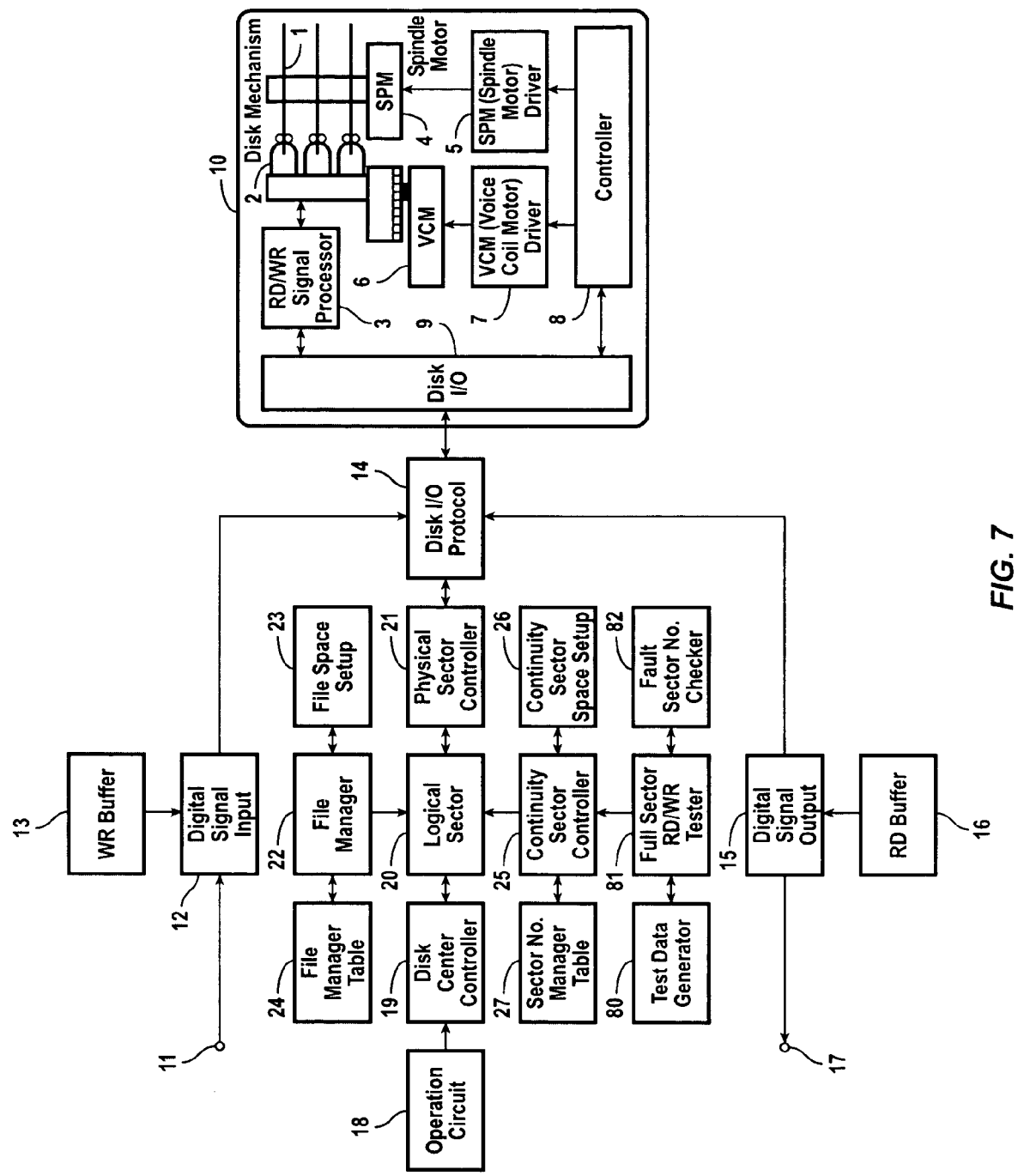
FIG. 7 is a simplified block diagram of a representative example data recording apparatus in a still further particular embodiment according to the present invention.

FIG. 7 is a simplified block diagram of a representative example data recording apparatus in a still further particular embodiment according to the present invention. This diagram is merely an illustration and should not limit the scope of the claims herein. One of ordinary skill in the art would recognize other variations, modifications, and alternatives. The specific embodiment illustrated in FIG. 7 comprises a test data generator 80, a full sector RD/WR tester 81, and a fault sector number checker 82, as well as many functional blocks previously discussed with reference to FIG. 1. In specific embodiments, recording can be controlled so that sectors disabled for recording or reading back ("fault sectors") are detected in the first area for recording continuous data and those fault sectors are not used.

The operation circuit 18 processes a command for checking a fault sector in the first area on a magnetic recording disk. Then full sector RD/WR tester 81 can record the test data generated in the test data generator 80 in the specified sector, and then verify the recording operation. If the recorded data does not match the test data in the verify operation, the verify operation can be repeated a specified number of times. The number of the sector determined to be unusable by tester 81 can be stored in a fault sector number setup circuit 82. The stored fault sector number can be stored in the third area of the disk together with the data stored in the file manager table 24 and the sector number manager table 27.

Figure 8:
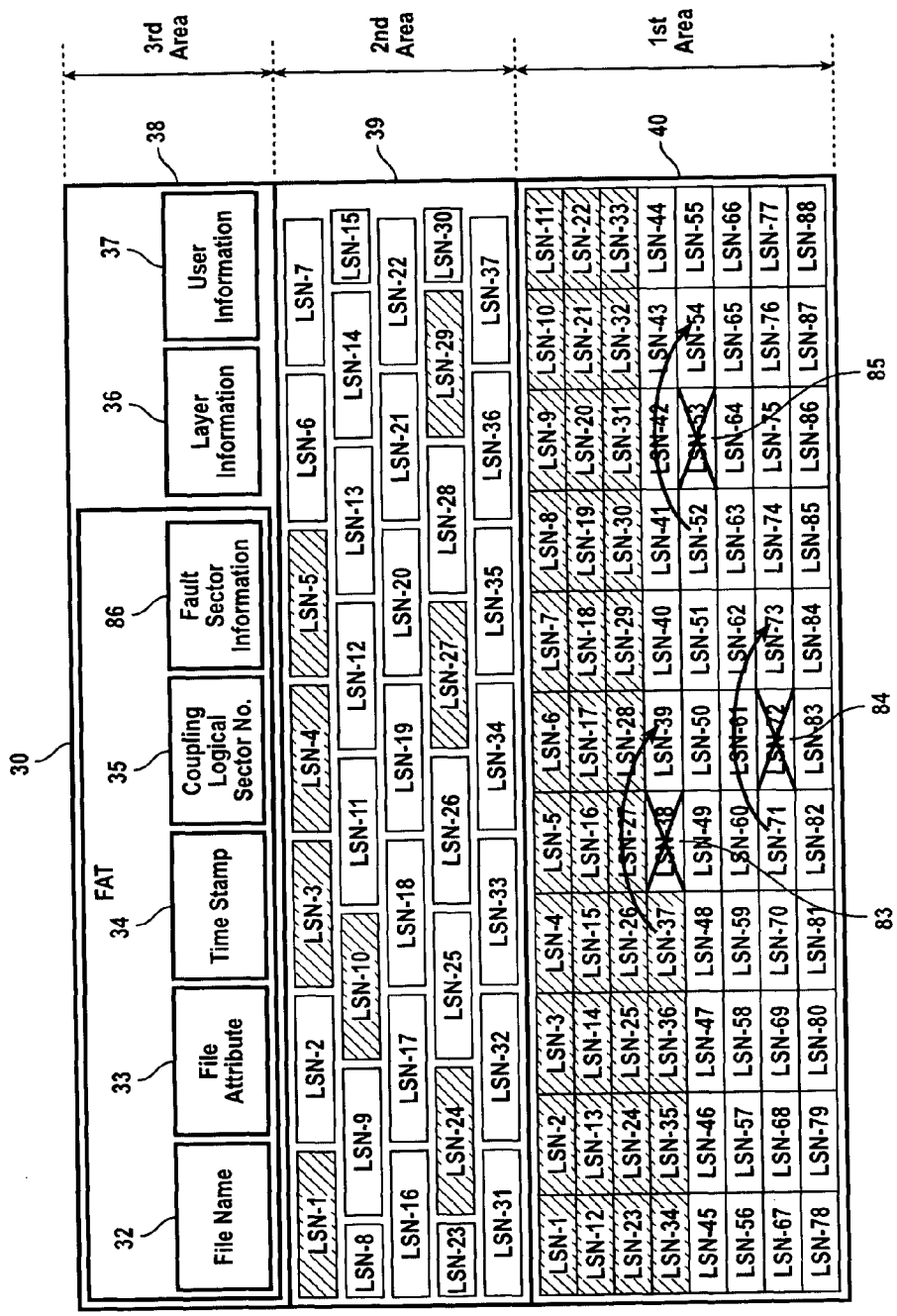
FIG. 8 is a simplified diagram showing an example arrangement of data recorded on a hard disk in a still further particular embodiment according to the present invention.

FIG. 8 is a simplified diagram showing an example arrangement of data recorded on a hard disk in a still further particular embodiment according to the present invention. This diagram is merely an illustration and should not limit the scope of the claims herein. One of ordinary skill in the art would recognize other variations, modifications, and alternatives. In FIG. 8, there are fault sectors 83 to 85 in the first area 40 of a hard disk. The fault sector information field 86 can store fault sector numbers 83 to 85, representing the fault sectors in the first area 40 of the hard disk. When recording continuous data, the data recording apparatus that assigns numbers to logical sectors can skip the fault sectors.

When data is record in logical sectors, the sectors can be specified so that fault sectors 83 to 85 are skipped. In other words, the physical sector controller 21 in FIG. 7 can assure that the head number, the cylinder number, and the sector numbers are transmitted to the disk I/O protocol circuit 14 so as to avoid accessing the fault sectors 83 to 85. Consequently, when the head reaches one of the fault sectors (83-85), the recording can be stopped temporarily, then a record command can be transmitted to the disk I/O protocol circuit 14 so as to restart the recording at a sector following the fault sectors.

Select embodiments can maintain data throughput by recording the same data in the fault sectors as that recorded in the consecutive sectors just before the fault sectors 83 to 85. In these embodiments, the recording need not be halted temporarily. In a representative embodiment according to the present invention, the fault sector numbers can be already held in the fault sector number checker 82 beforehand, so the disk I/O protocol circuit 14 can record the same data in fault sectors 83-85. The I/O protocol circuit 14 can receive the data from the digital signal input circuit 12, and it can record the data in the sectors just before the fault sectors 83-85.

Furthermore, in a representative embodiment according to the present invention, a disk type recording/reading apparatus can be disposed so as not to access a fault cylinder that includes fault sectors. When compared with a recording operation that skips only fault sectors, the recording operation that can skip a whole cylinder including fault sectors can substantially prevent throughput degradation due to fault sectors. In such embodiments, the record operation can be stopped in cylinders in which continuous record operation is usually done.

Figure 9:
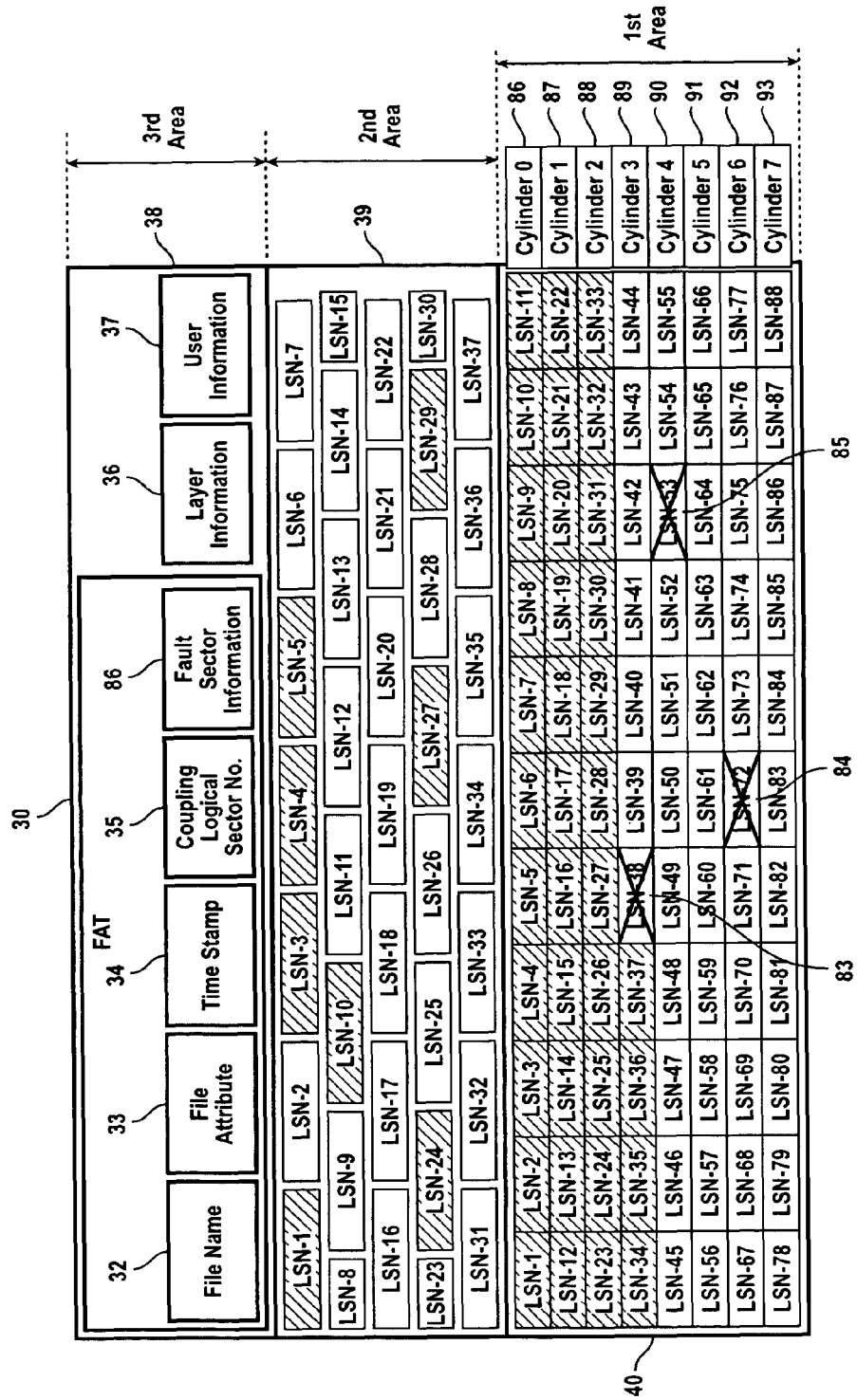
FIG. 9 is a simplified diagram showing an example arrangement of data recorded on a hard disk in a still further particular embodiment according to the present invention.

FIG. 9 is a simplified diagram showing an example arrangement of data recorded on a hard disk in a still further particular embodiment according to the present invention. This diagram is merely an illustration and should not limit the scope of the claims herein. One of ordinary skill in the art would recognize other variations, modifications, and alternatives. FIG. 9 illustrates cylinders 86 to 93 in the first area 40.

Cylinder numbers 0 to 7 are assigned to those cylinders 86 to 93. Among cylinders 86 to 93, each of cylinders 3, 4, and 6 includes a fault sector. The fault sector numbers are held in a fault sector number checker 82 beforehand, so that the physical sector controller 21 recognizes the numbers of the cylinders that include fault sectors. The fault cylinder numbers recognized by the physical sector controller 21 are thus excluded from the numbering of the continuity sectors, thereby continuous data can be recorded as described above.

In specific embodiments, detecting and skipping fault sector and cylinder numbers can be done in the first area of the hard disk, but it is also possible to perform similar operations on the second and third areas. In a representative embodiment according to the present invention, continuous data can be recorded by skipping fault sectors using the sector RD/WR tester 81 to detect fault sectors on a hard disk, for example. Further, a fault sector number checker 82 can store and recognize the fault sector numbers. In some embodiments, data throughput can be improved by recording the same data as that in the sectors positioned just before the fault sectors into the fault sectors themselves, thereby avoiding starts and stops of the recording process. In some specific embodiments, recognizing a cylinder that includes fault sectors and skipping the cylinder can be done to record continuous data in cylinders. Data throughput can be improved in many such embodiments.

Next, further representative embodiments according to the present invention will be described with reference to FIG. 10. In a specific embodiment, a data recording apparatus records and reads back data streams obtained by compressing video and/or audio signals to digital data with use of, for example, MPEG or MJPEG encoding on a disk type recording medium, such as a hard disk.

Figure 10:
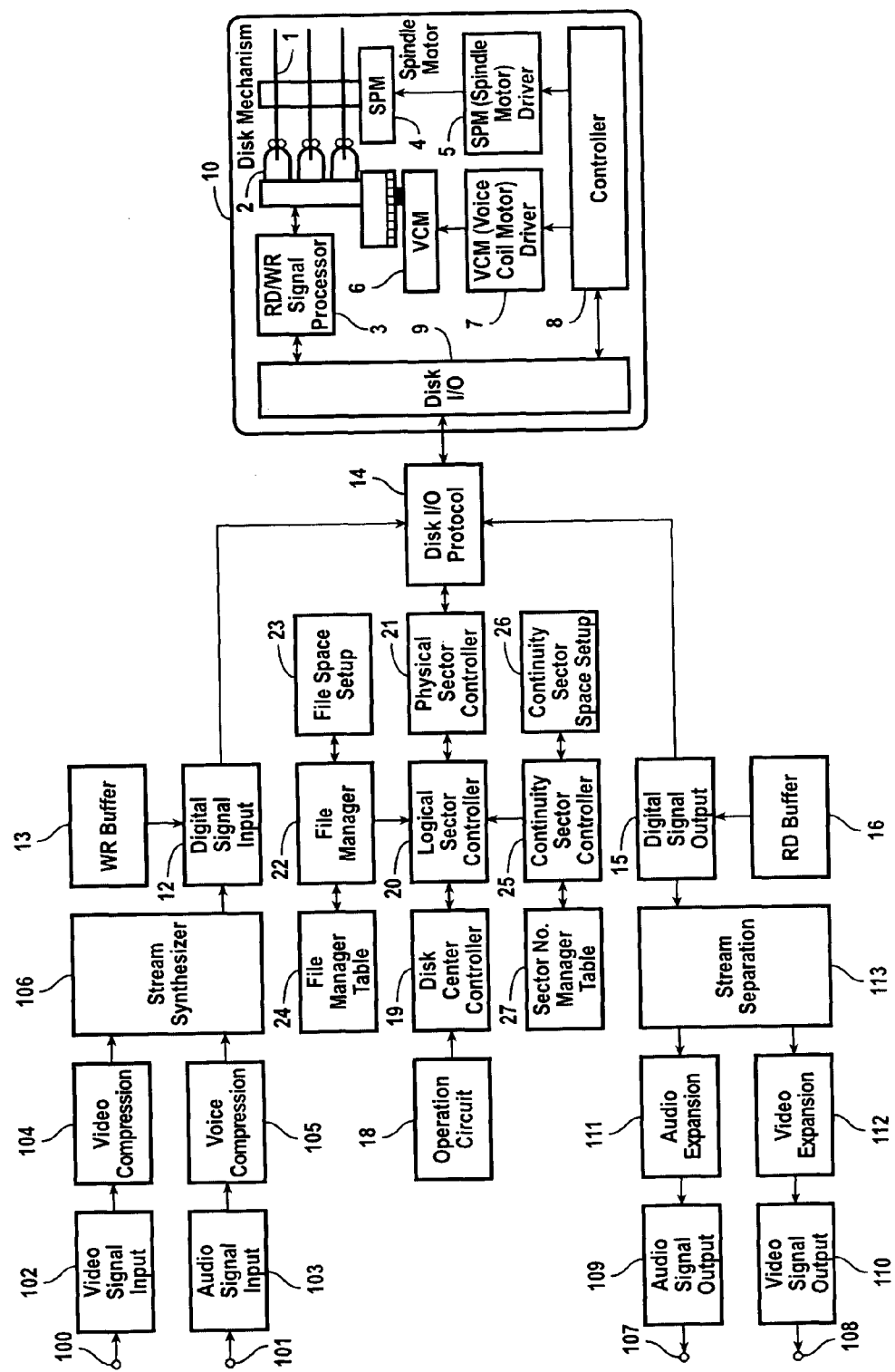
FIG. 10 is a simplified block diagram of a representative example data recording apparatus in a yet still further particular embodiment according to the present invention.

FIG. 10 is a simplified block diagram of a representative example data recording apparatus in a yet still further particular embodiment according to the present invention. This diagram is merely an illustration and should not limit the scope of the claims herein. One of ordinary skill in the art would recognize other variations, modifications, and alternatives. Many functional blocks in FIG. 10 have been discussed previously with reference to FIG. 1. The data recording apparatus shown in FIG. 10 comprises a video signal input terminal 100 and an audio signal input terminal 101. A video signal input circuit 102 and an audio signal input circuit 103 can be coupled to video input terminal 100 and audio input terminal 101, respectively. A video compression process circuit 104 and an audio compression process circuit 105 can be coupled to video input circuit 102 and audio input circuit 103, respectively in order to provide compression. Compressed outputs of video compression process circuit 104 and audio compression process circuit 105 can be coupled into a stream synthesizer 106, for example. The output of stream synthesizer 106 can be provided for storage into the storage medium. After retrieval, the digital output signal can be input into a stream separator 113. Stream separator 113 separates the digital signal input into a compressed video signal output, which can be input to video expansion circuit 112 and a compressed audio signal output, which can be input into an audio expansion circuit 111. Output from audio expansion process circuit 111 and video expansion process circuit 112 can be provided via an audio terminal 107 and a video signal output terminal 108, respectively.

Analog video signals entered from the video signal input terminal 100 can be converted to digital video signals and shuffled in the video signal input circuit 102, for example, then output to the video compression process circuit 104. The shuffled digital video signals can be compressed with, for example, MJPEG coding in the video compression process circuit 104, then output to the stream synthesizer 106. In the video compression process circuit 104, MJPEG coding may be replaced with another video compression coding such as the MPEG1 coding, and the like.

In a representative embodiment according to the present invention, analog audio signals can be entered from the audio signal input terminal 101, for example. The analog audio signals can be converted to digital audio signals and shuffled in the audio signal input circuit 103, then output to the audio compression process circuit 105, for example. The shuffled digital audio signals are compressed with, for example, the ADPCM encoding coding in the audio compression process circuit 105, then output to the stream synthesizer 106. The stream synthesizer 106 multiplexes both of the compressed video data and the compressed audio data at a time axis to data of a single system. The integrated data through the time-axis multiplex is entered to the digital signal input circuit 12, then recorded on a hard disk continuously.

During read back, the stream separator 113 separates the data output from the digital signal output circuit 15 to compressed video data and compressed audio data. The video compression process circuit 112 decodes and expands compressed video data and outputs the data to the video signal output circuit 110. The video signal output circuit 110 then unshuffles the digital video data so as to be converted to original analog video signals and output via the video signal output terminal 24.

The audio expansion process circuit 111 decodes and expands compressed audio data and outputs the decoded and expanded digital audio data to the audio signal output circuit 109. The audio signal output circuit 109 unshuffles the digital audio data and converts the data to original analog audio signals, then output the signals to the audio signal output terminal 23.

In the representative embodiments described above, video and audio signals can be compressed to digital signals and treated as continuous data. Specific embodiments can record both video and audio data continuously and read back at random in high quality. In addition, because both recording and reading can be done at the same time, video and/or audio signals can be read back without stopping the recording of video and/or audio signals.

CONCLUSION

Although the above has generally described the present invention according to specific systems, the present invention has a much broader range of applicability. In particular, while foregoing has described specific embodiments having a hard disk as a recording, the hard disk may be replaced with another disk type recording medium, such as an optical magnetic disk or a phase-change optical disk, and the like by those of ordinary skill in the art without departing from the scope of the presently claimed invention. The specific embodiments described herein are intended to be merely illustrative and not limiting of the many embodiments, variations, modifications, and alternatives achievable by one of ordinary skill in the art. Thus, it is intended that the foregoing description be given the broadest possible construction and be limited only by the following claims.

The preceding has been a description of the preferred embodiment of the invention. It will be appreciated that deviations and modifications can be made without departing from the scope of the invention, which is defined by the appended claims.

What is claimed is:

1. A data recording apparatus for recording video data, audio data, or both on a disk-type recording medium, the data recording apparatus comprising:
   a data recorder operative to record a first digital file including at least one of audio and video data of a specified file size sequentially in a first area of said recording medium, wherein the first digital file being requiring sequential recording in order to ensure a minimum sustained transfer rate., and further operative to record a second digital file including at least one of audio and video data randomly in a second area of said recording medium by copying the at least one of audio and video data from the first digital file from said first area,
   wherein each of said first and second areas on said recording medium comprise a plurality of recording blocks, and
   wherein said data recorder is further operative to record said first digital file in said recording blocks in an order of address in said first area and further operative to record said second digital file in said recording blocks in a random order in said second area.

2. A data recording apparatus according to claim 1 wherein each of said first and second areas is disposed radially on said disk-type recording medium.

3. A data recording apparatus according to claim 1 further comprising a area setting circuit operable to set up a third area in addition to said first and second areas, and said data recorder records management information in said third area relating to data that is recorded in said first area.

4. A data recording apparatus according to claim 3 wherein each of said first, second, and third areas is disposed radially on said disk-type recording medium.

5. A data recording apparatus according to claim 3 wherein each of said areas comprises a plurality of recording blocks, wherein said data recorder records said data in said first area in consecutive recording blocks and records in said third area addresses of said consecutive recording blocks.

6. A data recording apparatus according to claim 5 wherein a minimum recording unit for said first area and a minimum recording unit for said second area are of different sizes.

7. A data recording apparatus according to claim 3 further comprising a detecting circuit for detecting a faulty recording block on said disk-type recording medium, wherein said data recorder records location information of said faulty recording block in said third block.

8. A data recording apparatus according to claim 2 wherein said disk-type recording medium is a recordable optical disk.

9. A data recording apparatus according to claim 4 wherein said disk-type recording medium is a recordable optical disk.

10. A data recording method for recording video data, audio data, or both on a disk-type recording medium, the data recording apparatus comprising:
    fist recording step to record a first digital file including at least one of audio and video data of at least a specified file size sequentially in a first area of said recording medium, wherein the first digital file being requiring sequential recording in order to ensure a minimum sustained transfer rate;

second recording step to record a second digital file including at least one of audio and video data randomly in a second area of said recording medium by copying the at least one of audio and video data from the first digital file from said first area;

wherein each of said fist and second areas on said recording medium comprises a plurality of recording blocks;

wherein, in said first recording step, recording said first digital file in said recording blocks in an order of address in said fist area; and wherein, in said second recording step, recording said second digital file in said recording blocks in a random order in said second area.

* * * * *